A. S. GALBRAITH.
FLOOD GATE.
APPLICATION FILED FEB. 17, 1912.
1,063,123.
Patented May 27, 1913.
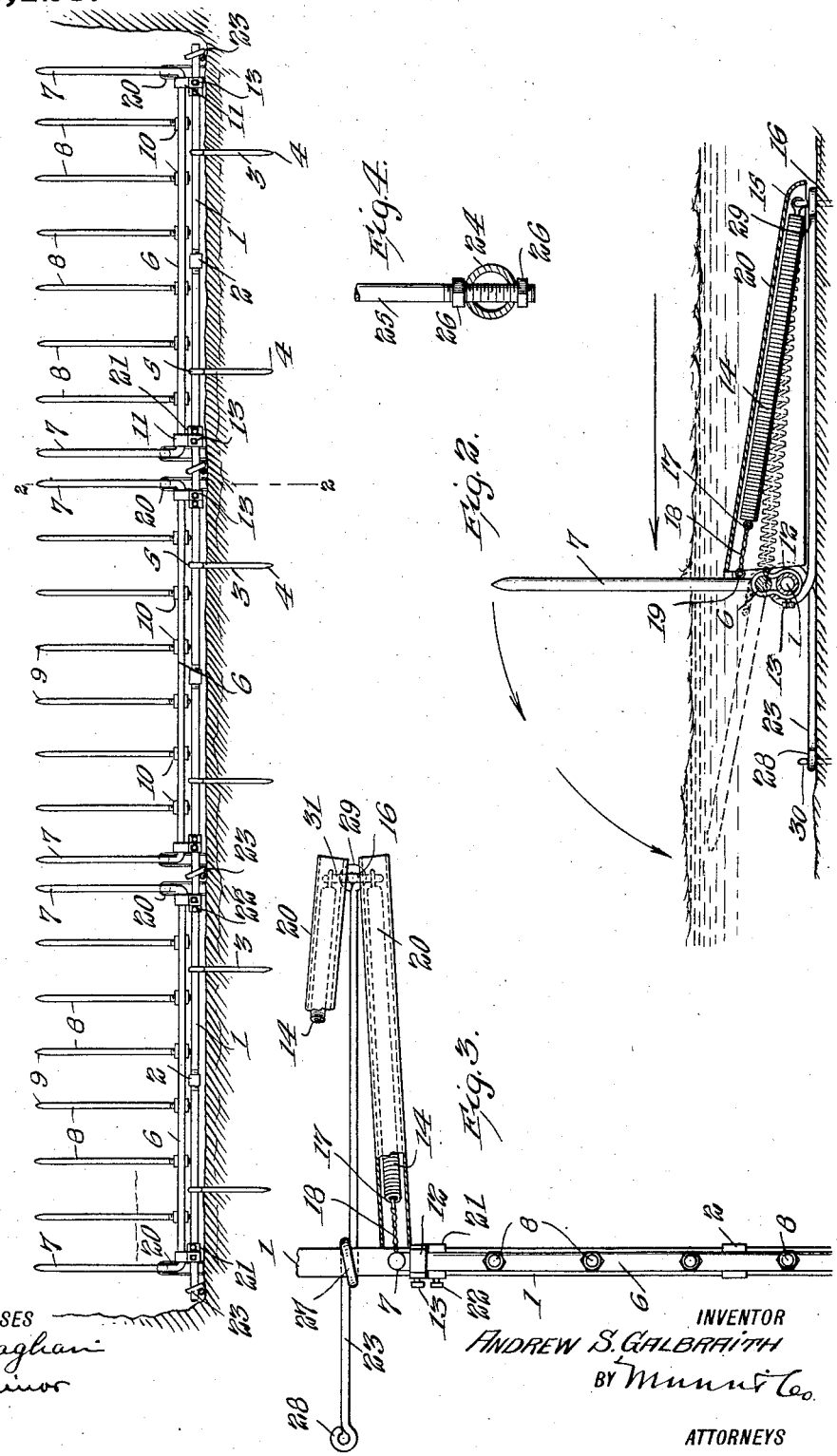
WITNESSES
E. W. Callaghan
C. E. Trainor
INVENTOR
Andrew S. Galbraith
BY Munn & Co.
ATTORNEYS

UNITED STATES PATENT OFFICE.

ANDREW STEPHEN GALBRAITH, OF BAXTER COUNTY, ARKANSAS.

FLOOD-GATE.

1,063,123.  Specification of Letters Patent.  Patented May 27, 1913.

Application filed February 17, 1912. Serial No. 678,191.

*To all whom it may concern:*

Be it known that I, ANDREW S. GALBRAITH, a citizen of the United States, and a resident of Baxter county, Arkansas, have invented certain new and useful Improvements in Flood-Gates, of which the following is a specification.

My invention is an improvement in flood gates, and has for its object the provision of a simple, inexpensive device of the character specified, composed of separable units, and capable of being increased or decreased in length for streams of different sizes, normally in erect position to prevent the passage of live stock, but capable of swinging out of position to permit the passage of drift, and automatically returned to position after the passage of the drift.

In the drawings: Figure 1 is a front view of the improvement; Fig. 2 is a transverse vertical section on the line 2—2 of Fig. 1; Fig. 3 is a plan view of a portion of the gate; and, Fig. 4 is a partial enlarged transverse section of the base bar of one of the units.

The present embodiment of the invention is composed of a plurality of units or sections, all of which are hinged to a tubular base bar, of piping or the like, and composed of a plurality of sections 1 connected by unions 2. The base bar is arranged near the ground or bottom of the stream, across which the flood gate is to extend, and is held in place by stakes 3, driven into the ground. Each stake has a pointed lower end 4, and a ring 5 at its upper end which encircles the bar, and the said bar is preferably spaced slightly above the ground as shown in Fig. 1. The gate sections or units are hinged to the base bar, and each section or unit is composed of a rod or bar 6, having each of its ends bent laterally at right angles to the bar to form a pair of parallel arms 7.

The bar 6 may be solid or tubular, and in either case is provided with a plurality of transverse openings, spaced apart at equal distances, for receiving one end of arms 8, each arm being threaded at the end adjacent to the bar 6, and pointed at the other end, as indicated at 9. The arms 8 are held in position by nuts 10, a nut being arranged on each side of bar 6.

The arms 8 are in the same plane with arms 7, and all of the arms are spaced at equal distances from each other. Each gate section is hinged to the base bar, by means of loops 11, each of which encircles the base bar and the bar 6 of the gate section. The sides of the loop are bent inwardly between the bars 6 and 8, as indicated at 12. (Fig. 2).

Each gate section is connected to the base bar by two hinges, one near each end of the gate section. The sections of the base bar are preferably so arranged that the unions 2 connecting the base bar sections are intermediate the ends of the gates. Each of the loops 11 is rigidly connected to the base bar, by means of a set screw 13, passing through the loop and engaging the base bar. The bar 6 turns in the upper portion of the loop.

The gate sections are normally held in vertical position, by means of coil springs 14. Each spring is connected at one end to an eye 15, in a stake 16, which is driven into the ground on the upstream side of the gate, a suitable distance from the gate. The other end of the spring is provided with an eye 17, engaged by a chain 18.

Each arm 7 of the gate has an eye 19 engaged by the other end of the chain, and the said springs hold the gate in upright position against the end of a housing or cover 20, substantially U-shaped in cross section, and gradually decreasing in height from the gate to the stake 16, and covering the chain 18 and spring 14.

A ring or band 21 is arranged on the base bar 1, on the inner side of each loop 10, and each ring is held in place on the bar, by means of a set screw 22. The rings or bands hold the gate sections from lateral movement on the base bar.

The base bar and in fact the entire structure is held in position in the stream, by means of brackets, shown in Figs. 1–2 and 3. Each bracket is composed of a rod or bar 23, provided intermediate its ends with a coil 27, and at each end with an eye 28 and 29. The coil 27 forms a bearing for engaging the base bar 1, and each eye 28 and 29 is engaged by a stake, the eye 28 by a stake 30, and the eye 29 by the stake 16 before mentioned.

The bars are arranged transversely of the base bar, and the coil is nearer the eye 28 than the eye 29. The eye 29 is on the upstream side of the gate, and the stake 30 has a cross head at its upper end, with which the eyes 15 of adjacent springs 14 are connected. The stake 16 thus acts to hold the springs 14 in place, as well as the bar 23.

The bars 23 are arranged between the gate sections, as shown in Fig. 1, and a spring 14 is arranged at each end of each gate section, two springs being connected to each stake 16.

The bars 6—7 of the gates may be of tubing if desired. In Fig. 4 the bar 24 corresponds to bar 6, and the arm 25 to the arms 7 or 8. With tubular bars for the bottom of the gate sections, the arms 25 are passed through registering openings in the side wall of the bar, and nuts 26 are threaded onto the arms, above and below the bar 24.

The number of gate sections may be increased or diminished, in accordance with the width of the stream, and the base bar may also be made longer or shorter for the same purpose. The housings 20 prevent injury to the springs 14, from drift or the like, and also prevent the said drift from interfering with their action.

Under ordinary conditions, the springs hold the gates in erect position, so that a perfect fence is formed across the stream. Should drift collect on the upstream side of the gate in sufficient quantities, one or more of the sections will be swung into the dotted line position of Fig. 2, to release the drift and permit it to pass on down stream. After the drift has passed, the springs return the gate sections to original position. Light drift may pass between the arms 7—8, but heavy materials are held until a sufficient quantity collects to swing a gate section or sections.

I claim:

1. A flood gate comprising a base bar composed of a plurality of alined sections, unions threaded onto the adjacent ends of the sections, a plurality of holding stakes for the base bar, each stake having its lower end pointed, and its upper provided with a ring engaging the bar, a plurality of gate sections hinged to the bar, each section comprising a bar having a lateral arm at each end, the arms extending in the same direction, a plurality of arms detachably connected to the bar between the first-named arms, all of said arms being in the same plane and spaced apart from each other, a loop at each end of each gate section encircling the bar of the gate and the base bar, a set screw traversing the loop and engaging the base bar, a housing at each end of each gate section on the upstream side of the gate, each housing being substantially U-shaped in cross section and decreasing gradually in height from the gate, a spring connected to each end of each gate section in the housing and a holding stake at the end of the housing remote from the gate for engagement by the other end of the spring.

2. A flood gate comprising a sectional base bar, means for holding the bar to the ground, a plurality of independent gate sections for the bar, a housing at each end of each section on the up stream side of the base bar, and a spring in each housing pulling the gate section toward the housing, said housing forming a stop for holding the gate sections in vertical position.

3. A flood gate comprising in combination with the gate, a housing at each end thereof, and a spring in each housing pulling the gate toward the housing, said housings forming a stop for holding the gate in vertical position.

ANDREW STEPHEN GALBRAITH.

Witnesses:
 FRANK SWAIN,
 M. T. PRICE.

---

Copies of this patent may be obtained for five cents each, by addressing the "Commissioner of Patents, Washington, D. C."